Nov. 12, 1935.  R. H. WILEY ET AL  2,020,752

METHOD OF FORMING CONTACT POINTS

Filed Feb. 9, 1931

Inventors
RAYMOND H. WILEY,
CHARLES A. HUSTON and
CLARENCE J. KELLER

By Spencer, Hardman & Fehr
Their Attorneys

UNITED STATES PATENT OFFICE 2,020,752

METHOD OF FORMING CONTACT POINTS

Raymond H. Wiley, Charles A. Huston, and Clarence J. Keller, Anderson, Ind., assignors, by mesne assignments, to General Motors Corporation, Detroit, Mich., a corporation of Delaware Application February 9, 1931, Serial No. 514,650

3 Claims. (Cl. 29—155.55)

This invention relates to the manufacture of circuit connecting devices. More particularly the invention relates to the method of forming spherical heads on the ends of conductors.

An object of the present invention is to provide a simple and economical method of forming a spherical head to be used as a contact point for a circuit connecting device that is efficient in operation. This is accomplished by dipping the bared end of the conductor into molten solder and moving the end in an orbital motion about an arc. As is the usual procedure in soldering operations it is desirable to apply a flux of some sort to the metallic parts to facilitate the soldering operation, and if desired the excess of flux may be washed away or otherwise removed after the soldering is completed.

Further objects and advantages of the present invention will be apparent from the following description, reference being had to the accompanying drawing wherein a preferred embodiment of one form of the present invention is clearly shown.

Figure 1:
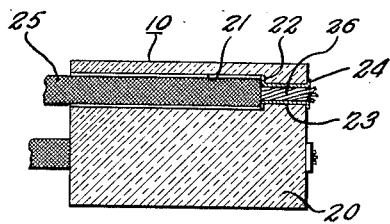
Fig. 1 is a sectional view of a circuit connecting device illustrating the assembly of parts prior to forming a spherical head on the end of a conductor.
Figure 2:
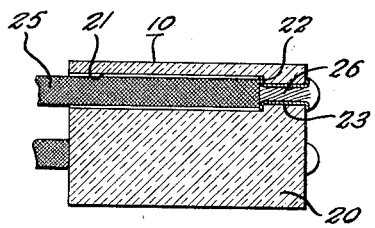
Fig. 2 is a view similar to Fig. 1 after forming a spherical head on the end of the conductor.

Referring to the drawing a circuit connecting device, which will be referred to as a device 10 is illustrated in Fig. 1, and comprises a plug or body 20 of insulating material. The plug 20 is provided with bores or passages 21 reduced at one end to form a shoulder 22 within the body. The reduced portion of the bore is lined with an eyelet 23. The eyelet 23 has a flared portion at one end engaging the shoulder 22 and the end of the eyelet is spun or riveted over the body or plug as at 24 to prevent withdrawal of the eyelet from the body. While the plug is illustrated as having an eyelet 23, this element may be omitted, in which event the reduced portion of the bore 21 need be only large enough to receive the bared end 26 of the conductor.

To assemble the device as illustrated in Fig. 1, a small portion of insulation is removed from the end of a conductor or wire 25, forming a bared end 26, that is slightly greater in length than the eyelet 23. The conductor 25 is threaded through the passage 21 so that the end 26 will extend through the eyelet. The protruding end 26 of the conductor is battered, or the strands are spread out forming an enlarged portion so that the conductor may not be easily withdrawn from the eyelet 23. The end of the conductor is then secured to the eyelet by a globule of solder.

The present invention provides a novel feature of forming a spherical head of solder upon the end 26 of the conductor which provides a good mechanical and electrical contact point for the device when brought into contact with mechanisms for the purpose of continuing a circuit.

Figure 3:
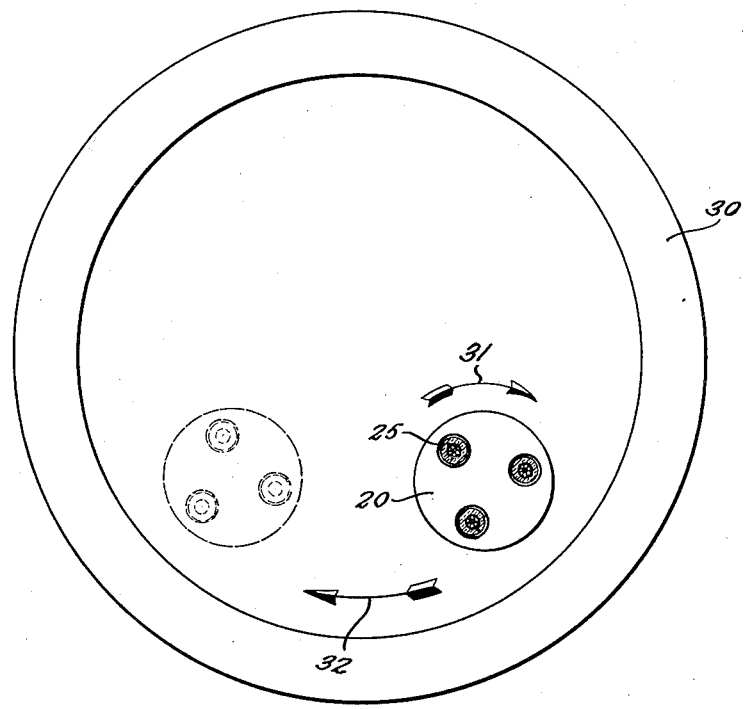
Fig. 3 is a plan view illustrating diagrammatically the motion of the connecting device while the ends of the conductor are immersed in molten solder.

The method for producing the spherical contact point on the end 26 of the conductor will now be described. The assembly illustrated in Fig. 1, having the exposed metallic parts fluxed or otherwise cleaned or prepared for soldering, is dipped into a bath of molten solder within a vessel 30 so that the elements supported by the device 10 to be soldered are immersed slightly below the surface of the molten solder. Referring to Fig. 3, while the elements are in contact with the molten solder, they are kept constantly in motion, or moved through the body of molten metal along a path substantially parallel to the surface thereof. The principal features of that movement define it as one of a generally orbital form, or one in which the assembly 10 is rotated about its own axis as indicated by the arrow 31, and at the same time is moved along a curved path generally indicated by the arrow 32. From another standpoint, this movement might be defined as a gyratory movement, or as herein elsewhere referred to as a twisting movement. On the completion of the orbital movement the device is taken from the molten metal and may be dipped into a neutralizing solution or otherwise washed or cleaned of the flux which prevents deterioration or corrosion of the metals as is well known to those versed in the art of soldering.

The advantages of twisting the device 10 during the time it is put into and taken from the molten metal is thought to keep the excess metal that clings to the conductor 25 smooth and globular, so that the excess metal will form a nicely rounded or spherical surface contact point of the desired configuration. In an instance of the kind where a device 10 is to be provided with a plurality of contact points, they may be formed simultaneously, in which event they would be uniform in size and configuration since they will be subjected to exactly the same conditions of temperature, solder liquefaction surface tension of the molten solder and all other factors entering into the formation of each of the associated contact points.

While the form of embodiment of the present invention as herein disclosed, constitutes a preferred form, it is to be understood that other forms might be adopted, all coming within the scope of the claims which follow.

What is claimed is as follows:

1. The method of forming a spherical contact point on a bared end of a flexible conductor, comprising the steps that include, immersing the bared end in molten solder, twisting the conductor while the bared end is in contact with the solder, and withdrawing the end from the solder while twisting the conductor.

2. The method of making electrical connectors, that comprises the steps in combination, assembling a plurality of flexible leads with a plug of insulation to provide bared ends of the leads at one end of the plug and, moving the bared ends of the leads along an orbital path in a bath of molten solder while substantially perpendicular to the surface thereof.

3. The method of assembling a plurality of flexible leads with a plug of insulation, and of forming contact points of uniform size on the end of each lead, comprising the steps in combination, securing eyelets in the plug at one end of longitudinal bores, threading the leads through the bores in the plug so that the bared ends project through the eyelets, dipping the end of the plug with its assembled lead ends and eyelets in a bath of molten solder, and rotating the plug assembly as it is moved along a curved path throughout its contact with the molten solder whereby globular deposits of solder are united to the bared lead ends and eyelets respectively.

CLARENCE J. KELLER.
RAYMOND H. WILEY.
C. A. HUSTON.